United States Patent [19]

Southard

[11] 4,230,088
[45] Oct. 28, 1980

[54] ROTARY INTERNAL COMBUSTION ENGINE WITH INTEGRATED SUPERCHARGING

[76] Inventor: Albert A. Southard, R.R. #3, Council Grove, Kans. 66846

[21] Appl. No.: 944,850

[22] Filed: Sep. 22, 1978

Related U.S. Application Data

[63] Continuation-in-part of Ser. No. 745,555, Nov. 29, 1976, Pat. No. 4,134,382, which is a continuation-in-part of Ser. No. 522,500, Nov. 11, 1974, Pat. No. 3,994,641, which is a continuation-in-part of Ser. No. 322,430, Jan. 10, 1973, abandoned.

[51] Int. Cl.³ .................. F02B 53/02; F02B 53/08
[52] U.S. Cl. .................. 123/203; 123/212; 123/243; 418/83; 418/100; 418/269
[58] Field of Search .......... 123/241, 242, 243, 212, 123/213, 203; 417/380; 418/83, 100, 269

[56] References Cited

U.S. PATENT DOCUMENTS

| 2,713,769 | 7/1955 | Johnson | 123/247 X |
| 3,076,446 | 2/1963 | Lockhart | 123/243 X |
| 3,202,142 | 8/1965 | Lockhart | 123/243 |

FOREIGN PATENT DOCUMENTS

| 1235671 | 6/1971 | United Kingdom | 123/243 |
| 1282261 | 7/1972 | United Kingdom | 123/242 |

Primary Examiner—Michael Koczo
Attorney, Agent, or Firm—Robert E. Breidenthal

[57] ABSTRACT

A rotary internal combustion engine with four vanes carried by a rotor engaging an internal oval housing surface to define four chambers that orbit the rotor axis. Two of the chambers, diametrically opposed, are operated as working chambers on a four-phase internal combustion engine basis in phase with each other. Supercharging is continued through an early part of the volume expansion and firing phase, whereby the rate of expansion per degree of rotation is substantial at the time firing is initiated. The other two chambers are operated as air pumping chambers to supercharge the working chambers via an air pressure accumulator. A lubricating liquid within the chamber is introduced into the pumping chambers for engine lubrication with excess being returned to the accumulator. The pressure of the liquid is applied hydraulically against the vanes to urge each radially outward with equal force. Excess air in the accumulator is vented to commingle with hot exhaust to further oxidation thereof and to limit accumulator pressure.

28 Claims, 12 Drawing Figures

ROTARY INTERNAL COMBUSTION ENGINE WITH INTEGRATED SUPERCHARGING

The present invention relates to new and useful improvements in rotary internal combustion engines and is a continuation-in-part of my copending application, Ser. No. 745,555, entitled Rotary Internal Combustion Engine that was filed Nov. 29, 1976, now U.S. Pat. No. 4,134,382. Said copending application is itself a continuation-in-part of Application Ser. No. 522,500 filed Nov. 11, 1974 (now U.S. Pat. No. 3,994,641) that was a continuation-in-part of now abandoned Application Ser. No. 322,430, entitled Rotary Internal Combustion Engine Having Cam Actuating Vanes that had been filed Jan. 10, 1973.

The present invention has generally the same objectives as my prior applications referred to in the preceding paragraph and has thereover the paramount objectives of supercharging or increasing the effective compression ratio of a rotary engine, and of improving the lubrication of the structure defining the chambers while improving the sealing of such chambers.

It is an important purpose of the invention to effect the supercharging by communicating an engine working chamber with a source of pressurized air for an angular interval that includes a substantial initial portion of the volume expansion phase during which firing occurs, with such communication being closed immediately prior to actual firing.

Broadly, the invention involves in a method of operating a rotary internal combustion engine of the type wherein a plurality of circumferentially separated zones orbit an axis with each zone alternately increasing and decreasing in volume as it orbits the axis, and wherein a zone is operated as an internal combustion engine working chamber through a four-phase power cycle as the volume thereof is successively twice increased and decreased, the improvement wherein another of the zones is operated as an air pumping chamber through a two-phase pumping cycle as the volume thereof is successively increased and decreased, and feeding air pumped by the air pumping chamber to the engine working chamber.

The invention has to do with a rotary internal combustion engine of the type wherein a plurality of circumferentially separated zones orbit an axis, with each zone alternately increasing and decreasing in volume as it orbits the axis, and wherein a zone is operated as an internal combustion engine working chamber through a four-phase power cycle as the volume thereof is successively twice increased and decreased, the improvement comprising the provision of means for operating another of the zones as an air pumping chamber through a two-phase pumping cycle as the volume thereof is successively increased and decreased, and means for feeding air from the air pumping chamber to the engine working chamber.

A somewhat more limited aspect of the invention involves in a rotary internal combustion engine of the type wherein a rotor is mounted for rotation in a housing having a generally oval inner wall surface with the rotor having four circumferentially spaced vane means rotatable therewith that slidingly and sealingly engage the wall surface to define and separate four chambers that are circumferentially spaced about the rotor that vary in volume during rotation of the rotor, the improvement comprising two of said chambers being diametrically opposed to each other and constituting engine working chambers, and the other two chambers being diametrically opposed to each other and constituting air pumping chambers, each of said engine working chambers being provided with intake means that are isolated from each other, with the intake means provided for one of the engine working chambers comprising said housing having first and second intake ports opening to a surface of rotation of the rotor, intake valve means for controlling the successive admission of air from the first and then the second intake ports during successive portions of the rotation of the rotor in one direction, said intake valve means including a passageway in the rotor that opens to said engine working chamber and the surface of revolution for successive registration with the first and second intake ports during predetermined portions of angular movement of the rotor, each of the engine working chambers being provided with exhaust means that are separate from each other, with the exhaust means for said one engine working chamber comprising the housing being provided with an exhaust port that opens to the surface of revolution and which is in registry with the said passageway during a predetermined portion of angular movement of the rotor, means for supplying air to the first intake port, and means inclusive of said air pumping chambers for compressing air and supplying the same to the second intake port.

Numerous other objectives, aspects, features and advantages of the invention become manifest on considering the following description of a preferred embodiment of the invention which is given in conjunction with the accompanying drawings illustrative thereof, wherein:

Figure 12:
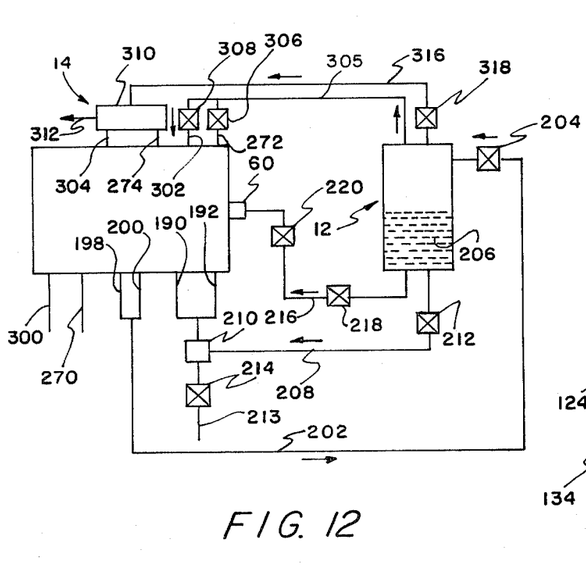

Referring now to the drawings wherein like numerals designate like parts throughout the various views, the numberal 10 designates the engine generally, and the numerals 12 and 14 respectively designate accessories employed therewith, namely, an accumulator vessel (see FIGS. 2 and 12), and an exhaust oxidizer (FIG. 12).

The engine 10 comprises a multisection hollow housing 16 comprising a pair of end sections 18 and 20, which are preferably of steel or aluminum and are mirror images of each other, between which is sealingly interposed a circular housing ring 22. Sealing gaskets 24 are interposed between the housing sections 18 and 20 and the ring 22, and the housing is held in assembled relation by a plurality of bolts 26 that extend through aligned openings 28 in the housing components that are provided with retaining nuts 30 threaded thereon.

As in the engine disclosed in my previously mentioned copending Application Ser. No. 745,555, a generally resilient and flexible metallic band 32 (preferably of stainless steel) is seated in grooves 34 and 36 in the adjacent faces of the housing sections 18 and 20. The configuration of the endless grooves 34 and 36 in which the band is sealingly seated are such that the band 36 is of an oval or substantially elliptical configuration.

The space 38 between the ring 22 and the band communicates with annular cavities 40 and 42 in the housing sections 18 and 20 via circumferentially spaced passageways such as those indicated at 44 and 46. The space 38 and the cavities 40 and 42 together with the connecting passageways 44 and 46 are for the circulation of a liquid coolant, which may be water or mixtures thereof with ethylene glycol for example, to realize necessary and usual functions of engine cooling. Conduits 48 and 50 are threaded into ports 52 and 54 in the ring 22 for the forced circulation of liquid coolant into and out of the space 38, whereby the necessary coolant circulation is effected. Inasmuch as the coolant pump and radiator do not in and of themselves constitute any part of the invention, the same are not illustrated or described as such would only serve to obscure the invention.

The housing 16 is stationary and is mounted in any suitable manner, with rotary mechanism disposed therein as now to be described. The rotary mechanism comprises an engine shaft 60 that is journaled for rotation through the housing sections 18 and 20 in any suitable manner at the positions indicated at 62 and 64. A pair of axially spaced valving hubs or plates 66 and 68 are disposed on the shaft 60 for rotation therewith. The hubs 66 and 68 are not rotatable on the shaft 60 as they are internally splined as at 70 and 72 and mate with corresponding external configuration of such portions of the shaft 60 that are disposed therein. The hubs 66 and 68 are rotatably received in facing circular cavities 78 and 80 in the housing sections 18 and 20. Sealing rings 82 and 84 are recessed in the housing sections 18 and 20 for making a rotary seal with the radial peripheries of the hubs 66 and 68.

A rotor 90 is disposed on the shaft 60 intermediate and in abutting relationship with the valving hubs 66 and 68. While the rotor 90 is disposed on the shaft 60, it is retained in an adjustable fixed angular relationship to the hubs 66 and 68. Similar means secure each of the hubs 66 and 68 to the rotor 90, with the hub 68 being secured by means of four axially extending screws 92 extending through four openings 94 in the hub 68. Four sets of three angularly spaced internally threaded openings 96 are provided in the rotor 90 and the four screws 92 are threaded into one selected opening of each of the four sets of openings 96. The heads of the screws 92 are recessed in the openings 94. The angular adjustability of the rotor 90 relative to the valving hubs 66 and 68 will be brought out presently.

Figure 4:
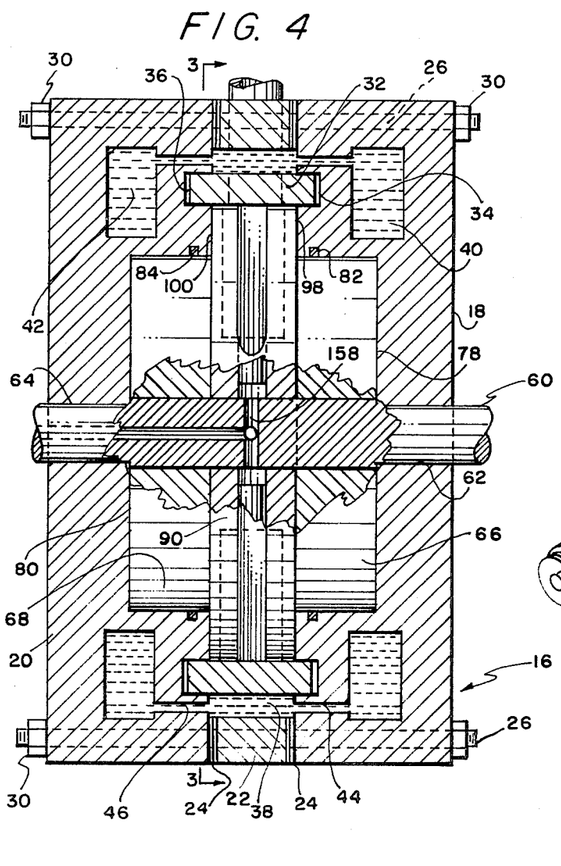
FIG. 4 is a central longitudinal sectional view of the engine.
Figure 5:
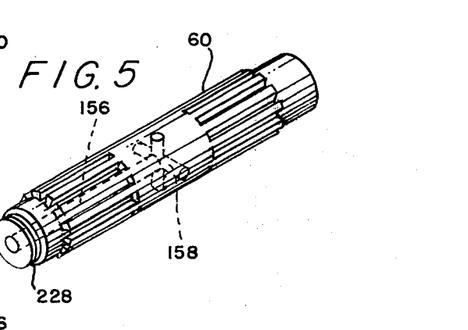
FIG. 5 is an isometric view of the shaft, with hidden details being shown in dashed outline.

The radial extent of the rotor 90 is greater than that of the cavities 78 and 80 in which the hubs 66 and 80 are disposed, and the axial extent of the rotor 90, which can conveniently be fabricated of aluminum, is such as to be closely spaced to but have free running clearance with respect to the adjacent faces 98 and 100 of the housing sections 18 and 20 as best shown in FIG. 4.

Figures 8, 9:
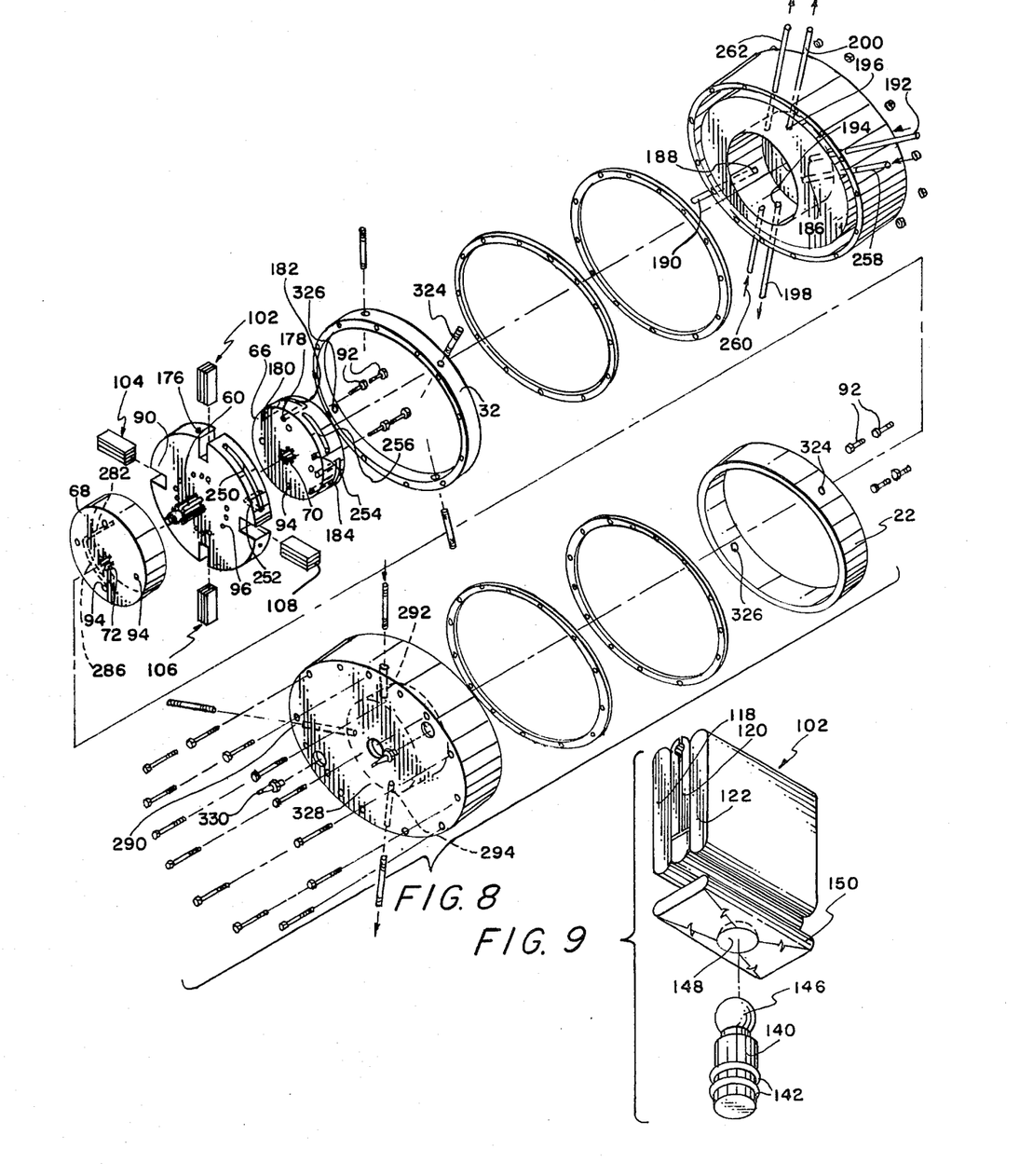
FIG. 8 is an exploded and folded isometric view of the engine with portions of the vane actuating structure being omitted, and with hidden details being shown in dashed outline.
FIG. 9 is an enlarged and exploded isometric view of one of the vane structures and its associated piston.

At four equiangularly spaced positions, the rotor 90 is provided with four vane means 102, 104, 106 and 108, which are respectively accommodated in the rotor 90 in radially outward opening slots 110, 112, 114 and 116 within which they make sliding fits to accommodate radially inward and outward movement thereof. Each of the vane means 102 shown in FIGS. 9 and 10 will suffice for all four. The vane means 102 comprises three generally rectangular plates 118, 120 and 122 of generally parallelepiped configuration, though the radially innermost and outermost extremities are preferably rounded as shown in FIG.9. The outermost faces of the plates 118 and 122 slidingly engage the adjacent faces of the rotor defining the slot 110, while their adjacent faces slidingly engage the opposite side faces of the plate 120.

Figure 10:
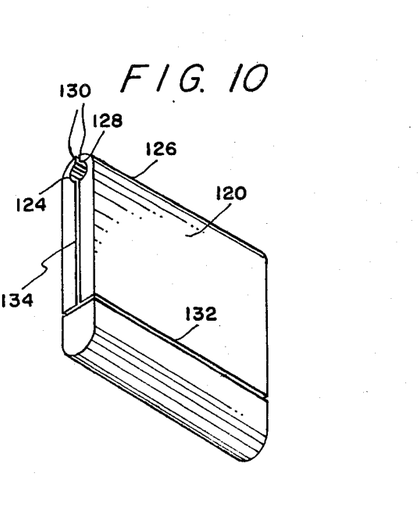
FIG. 10 is an enlarged isometric view of a center vane component.
Figure 11:
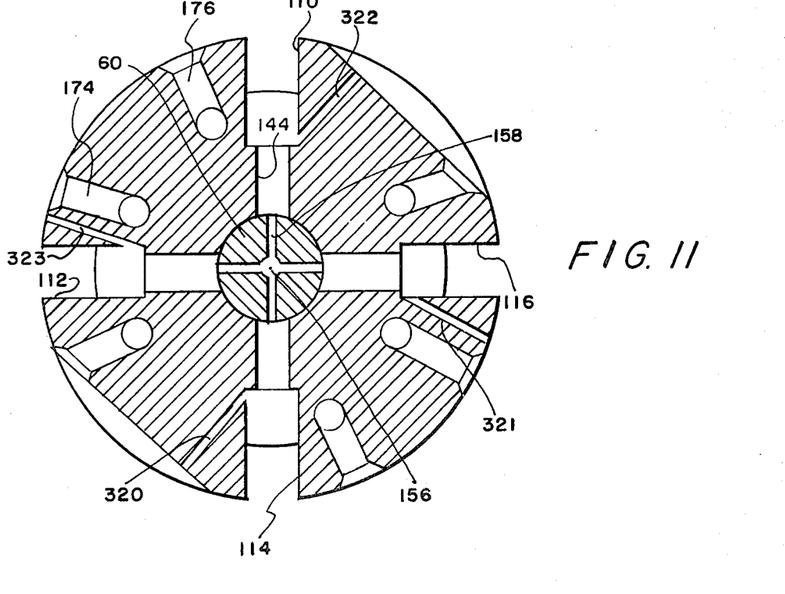
FIG. 11 is a transverse sectional view of the rotor and the engine shaft passing therethrough; and, FIG. 12 is a schematic diagram of the fluid line interconnections between the engine and its accessory accumulator.

For the purpose of effecting a better seal of the vane means 120 against the inner side of the housing band 32, and for facilitating lubrication of the vane means 102 relative to all surfaces with respect to which the same is placed in sliding contact, the middle plate 120 is specially grooved as shown best in FIG. 10. Such special grooving comprises the plate 120 being provided with a cylindrical opening 124 that extends entirely through the axial extent of the plate 120 at a position in closely spaced proximity to the radially outermost edge 126 of the plate 120. A slot 128 of lesser width than the diameter of the opening 124 opens the entire length of the latter through the radially outermost extremity of the plate 120 so as to constitute a pair of oil wiping lips at the radially outermost extremity of the slot 128. In addition, the plate 120 has a groove 132 that extends entirely about the plate 120 at a position adjacent the radially innermost end of the latter. The groove 132 has communication with the opposite ends of the opening 124 by means of grooves 134 at its opposite ends (one of which is visible in FIG. 10).

Means is provided for radially urging outward movement of the vane means 102 which accommodates relative movements of the plates 118, 120 and 122 so that they may each conform to the noncircular configuration of the inner surface of the housing band 32. Such means comprises a piston 140 provided with seal rings 142 disposed within a cylindrical bore 144 that extends between the bottom of the slot 110 and the shaft 60. The radially outermost end of the piston 140 is ball-shaped as at 146, and such ball-shaped extremity is received in a correspondingly shaped pocket 148 formed at the center of the radially innermost side of a pusher plate 150 disposed within the innermost end of the slot 110 to underlie and engage the radially innermost ends of the vane plates 118, 120 and 122. The arrangement is such that the plate 150 can rock sufficiently to accommodate relative movement of the plates 118, 120 and 122 and can communicate radially directed forces between each of the vane plates and the piston 140.

The shaft 60 has a central axial passageway 156 from one end thereof to an axial position corresponding to the vane means 102-108 at which position it terminates in a cruciform passageway 158 opening to the exterior of the shaft 60 at four positions that register with the four bores 144 so as to afford fluid communication between the central shaft passageway 156 and the radially innermost ends of all four of the pistons 140 of the vane means 102-108. The previously mentioned angular adjustments of the rotor 90 do not disrupt such communication. Means will presently be described for maintaining oil in passageways 156 and 158 and the bores 144 under pressure. It will be evident that the hydraulic means as thus far described will urge each of the vane means 102-108 radially outward with equal force as all of them are symmetrical to each other and of equal size.

The described vane means 102-108 separate the space between the oval band 32 and the rotor 90 into four chambers or zones, namely, chambers 160, 162, 164 and 166. It will readily be perceived that each of said chambers alternately increases and expands in volume by virtue of the oval configuration of the band 32 that is slidingly and sealingly engaged by the vane means 102, 104, 106 and 108, with each chamber twice expanding and twice reducing in volume during each full revolution of the rotor 90.

Two of the chambers, namely, 160 and 164, which are diametrically opposed to each other, are operated as air pumping chambers for supercharging the engine and other purposes that will become evident.

The operation of the air pumping chambers 160 and 164 and their relation to the accumulator 12 to which their pumping output is directed will be first described.

Intermediate the slots 110 and 112 which accommodate the vane means 102 and 104, the rotor 90 is provided with a pair of L-shaped passageways 174 and 176 that open through the periphery of the rotor at one end of each so as to communicate with the chamber 160, and such passageways at their other ends register with passageways 178 and 180 in the valving hub 66 (see FIG. 8) that open into an elongated groove 182 in the hub 66. The arrangement is such that the chamber 160 communicates at all times with the interior of the groove 182.

In an identical manner, the chamber 164 communicates at all times with another groove 184 in the valving hub 66. As their associated chambers 160 and 164 are diametrically opposed, so are the grooves 182 and 184 diametrically opposed, with their centers being 180° apart about the periphery of the hub.

The housing section 18 is provided with a pair of diametrically opposed inlet ports 186 and 188 that are respectively in fluid communication registry with the grooves 182 and 184 during a portion of the rotation of the rotor 90, such inlet ports 186 and 188 are fitted with air inlet lines 190 and 192 which respectively communciate with the grooves 182 and 184 during said portion of the rotation of the rotor 90. Such portion of the rotation is that during which the chambers 160 and 164 are increasing in volume, whereby air is induced to flow into such chambers through the lines 190 and 192, so as to constitute the intake phase or stroke of the chambers 160 and 164. It will be noted that chambers 160 and 164 operate to intake air in unison, that is, they are in phase with each other.

The housing section 18 is also provided with a pair of diametrically opposed outlet ports 194 and 196 that are angularly offset from the inlet ports 186 and 188 to register with the grooves 182 and 184 during another portion of the rotation of the rotor 90 during which the chambers 160 and 164 are diminishing in volume in an arrangement such that air in the chambers is forcibly expressed therefrom to the outlet ports 194 and 196 and to the outlet lines 198 and 200 that are connected thereto. As with the intake of air, the chambers 160 and 164 operate in unison, that is, in phase with each other on discharging output air.

Referring now to FIG. 12, the compressed air output lines 198 and 200 are connected to an air line 202 that is in turn connected to the accumulator 12 through a check valve 204. The accumulator 12 is partially filled with oil or a liquid lubricant 206. An oil line 208 is connected between a bottom portion of the accumulator 12 and a mixing box 210, such line 208 including a control valve 212 whereby the rate at which oil sprayed into the mixing box 210 can be controlled. Ambient air is inducted into the mixing box 210 via line 213 provided with a manually controllable valve 214, the mixing box 210 being connected to the inlet pipes 190 and 192 as shown. The arrangement is such that air entering the chambers 160 and 164 includes or has entrained therewith an oil mist or spray for a purpose subsequenty to be apparent. The valve 214 enables the operator to choke down or limit the output pressure or rate of air flow in the line 202.

Figures 6, 7:
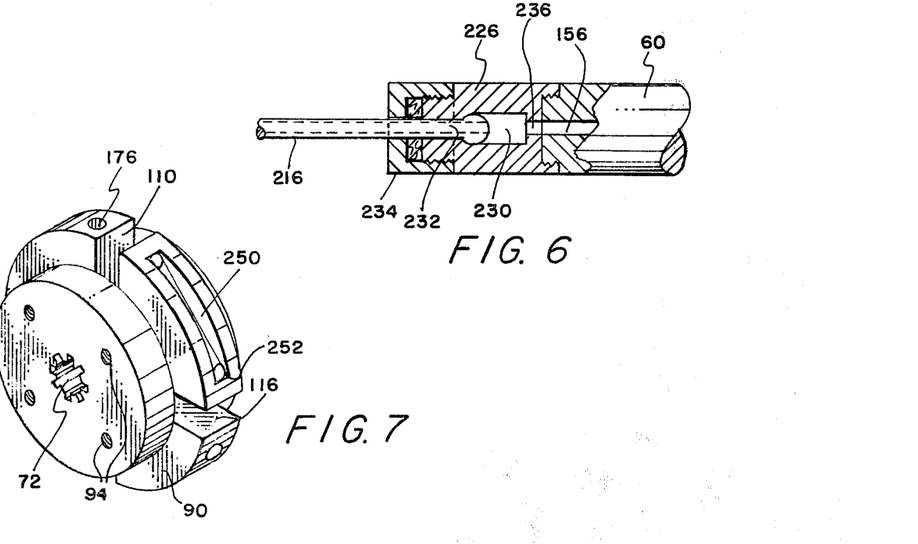
FIG. 6 is a fragmentary detail view, partially in central longitudinal section of the coupling of the oil line of the accumulator to the distribution passageway of the engine shaft.
FIG. 7 is an isometric view on a reduced scale of the rotor and valving hubs as they are oriented when in assembled relation.

The lower part of the accumulator 12 is connected by an oil line 216 to the passageway 156 in the shaft 60. The oil line 216 includes a manual shut-off valve 218 and a check valve 220. The coupling of the oil line 216 to the passageway 156 necessitates a rotary coupling such as shown in FIG. 6, wherein it will be seen that an adapter 226 is threaded upon the reduced threaded end 228 of the shaft 60, such adapter having a cavity 230 therein that axially and rotatably receives an end portion 232 of the oil line 216. The adapter 226 is provided with a packing gland 234 through which the oil line 216 sealingly and rotatably extends. The cavity 230 has an outlet 236 whereby direct fluid communication is established between the interior of the stationary oil line 216 and the passageway 156 in the rotating shaft 60. The oil line 216 and its connections to the accumulator 12 and the shaft 60 serve to hydraulically urge radially outward movement of the vane means 102-108 under the influence of pressure within the accumulator 12. From another viewpoint, it will be seen that any fluid force acting against any of the vane means to urge them radially inwardly will act hydraulically to urge the other vanes radially outwardly, with the check valve 220 enabling such forces to exceed those caused solely by pressure within the accumulator 12.

The total fluid volume confined by the check valve 220 during rotation of the rotor and only a very small amount of oil must be supplied therethrough to compensate for any leakage from the system.

Attention is now directed to the operation of the chambers 162 and 166 as internal combustion engine working chambers. As will subsequently become plain, each of such chambers initially intakes ambient air while expanding in volume, and is then connected to the compressed air of the accumulator 12 while undergoing reduction in volume. During the next increase in volume the combustion and working phase is accomplished, followed by exhaust when the volume next decreases.

In the preferred phasing of the supercharging of the chambers 162 and 166, that is the relationship of the interval that each of the chambers communicates with the source of pressurized air (accumulator 12) to the periodic decreasing and increasing in volume of the chamber, the chamber commences a cycle of communication with the pressurized air source while the volume thereof is decreasing and intermediate its maximum and minimal values, and such communication is maintained until the volume is at its minimum and is thereafter continued until the volume is substantially greater than its minimum value, with initiation of combustion being initiated promptly thereafter as the volume continues to increase to approach its average value. Exhaust and ambient air intake are next respectively effected during the next decrease and increase in volume.

An angular adjustment of the hubs 66 and 68 relative to the rotor 90 enables a degree of adjustability in the phasing as a function of the valving hereinafter described.

Figures 1, 2, 3:
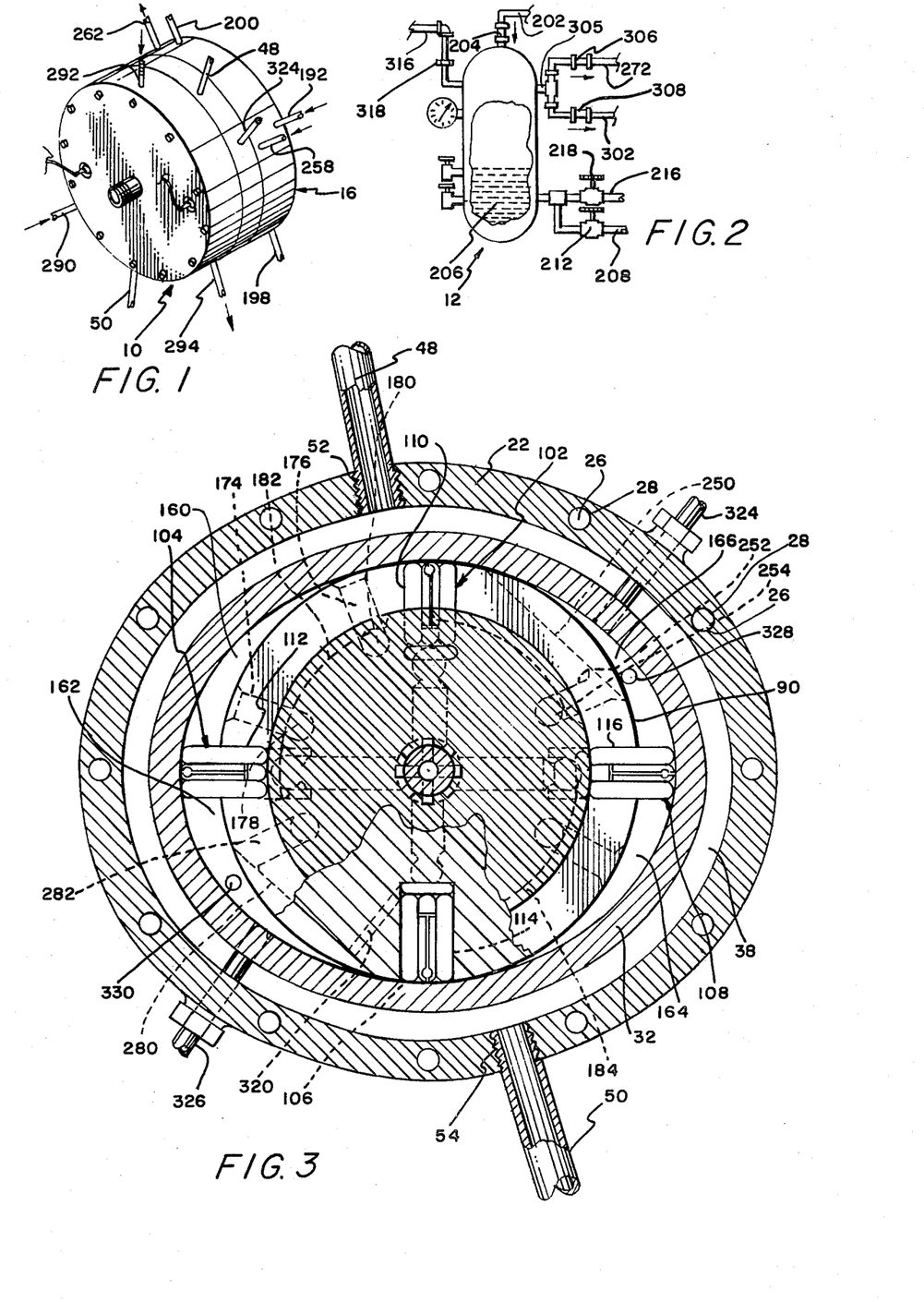
FIG. 1 is an isometric view of the supercharged rotary engine with accessory units removed therefrom.
FIG. 2 is a side elevational view of the partially filled air pressure accumulator and a partial illustration of the conduits and valving connected thereto, with a portion of the wall being broken away to show the contents thereof.
FIG. 3 is an enlarged medial transverse sectional view of the engine taken upon the plane of section line 3—3 in FIG. 4, with certain hidden details being shown in dashed outline, and with all conduits other than the coolant conduits being omitted.

Considering initially the chamber 166, it will be seen in FIGS. 3 and 7 that the rotor 90 has a kerf or cut at 250 which has communication via passageways 252 and 254 in the rotor and the valving hub 66 with a groove 256 in the latter.

The housing section 18 is provided with three ports 258, 260 and 262 that sequentially register with the groove 256 during rotation of the rotor 90, such ports being respectively for intake of ambient air, for connection to compressed air in the accumulator, and exhaust. Such ports are angularly disposed so that port 258 communicates with the groove 256 as the chamber 166 expands in volume subsequent to having exhausted combustion products, with port 260 communicating with the same during an angular interval that commences during the next ensuing reduction in volume and terminates during the following expansion in volume. It is after such termination of communication of the port 260 with the groove 256 and while the chamber is expanding at a substantial rate that combustion is started. The port 262 communicates with the groove 256 during the volume reduction immediately following the expansion during which combustion is started.

Preferably none of the ports 258, 260 and 262 concurrently communicate with the groove 256.

As in the case of conventional piston engines operating on a 4-stroke cycle, it will be evident that for various reasons (such as the inertial effects of the moving fluids), the exhaust interval and the ambient air intake intervals can respectively extend into the initial portions of the immediately ensuing expansion and reduction periods, respectively.

It will be noted that the groove 256 is axially spaced from the grooves 182 and 184 so that the compressor chambers 160 and 164 have connection to the chamber 166 only via the accumulator 12.

The chamber 162 is valved and substantially in identical fashion as that described in connection with the chamber 166. The rotor 90 being provided with a kerf 280 between the vane means 104 and 106 which communicates via passageway means 282 in the rotor 90 and the hub 68 with a groove 286 in the hub 68. The chambers 166 and 162 are diametrically opposed and their associated valving grooves 256 and 286 are also diametrically opposed though respectively in hubs 66 and 68. The housing section 20 is provided with ports 290, 292 and 294 that respectively bear the same relationship to the groove 286 that the ports 258, 260 and 262 bear to the groove 256.

As previously described in connection with the chamber 166, an ambient air line 300 is connected to the port 290, a compressed air line 302 is connected to the port 292, and an exhaust line 304 is connected to the port 294. Compressed air from the accumulator 12 is fed to the compressed air lines 272 and 302 via a line 305 and separate check valves 306 and 308. The exhaust lines 274 and 304 are connected to an oxidation manifold 310 to be discharged as indicated by the arrow 312.

The ambient air lines 270 and 300 can if desired or deemed expedient be provided with a manually controllable choke valve, not shown, similar to the valve 214 associated with lines 190 and 192.

In order to limit the maximum pressure within the accumulator 12, the latter is vented with the vented air being commingled with hot exhaust or combustion products in the manifold 10 to enhance the oxidation of the latter. For this purpose, an air vent line 316 is connected between the top of the accumulator 12 and the manifold 310 with a pressure relief valve 318 being disposed in the line 316.

In the preferred construction, means is provided to provide fluid communication between the chamber 162 and the radially innermost end of the slot 114 to accommodate the varying volume therein, and this is effected by a passageway 320. A passageway 322 serves a corresponding purpose for the chamber 166. Such fluid communication in an engine working chamber with the radially innermost side of the vane means trailing such chamber serves to transmit peak pressure of a firing chamber to urge all vanes outwardly.

Passageways 321 and 323 afford communication between the air pump chambers and the inner ends of the slots 116 and 112.

The passageways 320, 321, 322 and 323 not only provide breathers for the vane cavities, but they effectively increase the volume of the engine working chambers.

The engine 10 includes conventional means for introducing fuel into the chambers 162 and 166 prior to the combustion phase and such is preferably by fuel injection apparatus such as to include fuel injection nozzles 324 and 326. Illustration of the driving of the fuel injection means from the shaft 60 for the synchronous injection of fuel has been omitted as it would only obscure the actual invention and as such would be obvious to those skilled in the art.

A conventional ignition system can be provided inclusive of spark plugs 328 and 330, though such may not be essential as it may be possible to realize sufficiently high compression ratios to realize true diesel operation. The ignition system, if such is actually needed, has not been detailed for reasons similar to those mentioned in connection with the fuel system. If the engine is to operate on a diesel (compression ignition) basis, it is evident that the source of compressed air (accumulator 12) must supply pressurized air to the working chambers at a temperature in excess of the flash point of the fuel injected into the chambers. If deemed necessary or expedient, the accumulator 12 and high pressure air supply lines can be provided with thermal insulation to conserve the heat content of the compressed air and to minimize heating of their environments. Even if diesel operation is the desired mode of operation, the conventional spark ignition system is preferably included in the system if for no other reason than to assist in engine starting and to minimize the amount of battery drain in initially turning the engine by an electric starter or cranking system, not shown.

It will be evident to those skilled in the art that the oil or lubricating agent introduced into the air compression chambers and thence into the accumulator 12 must be selected to have flash or ignition points substantially greater than the highest temperatures that are produced in the air compression chambers and the accumulator 12 to avoid combustion thereof.

The introduction of an oil or lubricating agent mist into the ambient air fed into the air compressing chambers 160 and 164 serves to maintain a lubricating film of oil on all surfaces bounding such chambers and therefore lubricates the rotor and all the vane means and the surfaces engaged by the latter. Excess oil introduced into the chambers 160 and 164 is simply returned to the accumulator 12 with compressed air.

As alluded to previously, the introduction of pressurized air into an engine working chamber is preferably synchronized with the contraction and expansion in volume of such chamber in such a manner that such introduction is initiated during one of the contraction intervals and is continued well into the immediately following expansion interval. Such continuance of introduction serves to increase the pressure in the working chamber despite the expansion of the latter so that initiation of combustion (whether by spark or fuel injection) can be deferred until the rate of expansion per unit of rotation is reasonably high (well beyond the equivalent of top dead center in a piston engine). Deference of ignition or initiation of combustion until well into the expansion phase means that the vane means leading the working chamber is significantly extended from its retracted position and presents an appreciable area against which pressure resulting from combustion can immediately act to urge rotation. Check valves of course prevent any reverse air flow from the engine working chambers into the lines connecting the latter to the accumulator.

Having fully described the invention sufficiently to enable those of modest familiarity with the art readily to enjoy the same, attention is now directed to the appended claims.

I claim:

1. A method of operating a rotary internal combustion engine of the type wherein a plurality of circumferentially separated zones orbit an axis with each zone alternately increasing and decreasing in volume as it orbits the axis, and wherein a zone is operated as an internal combustion engine working chamber through a four-phase power cycle as the volume thereof is successively twice increased and decreased, the improvement wherein another of the zones is operated as an air pumping chamber through a two-phase pumping cycle as the volume thereof is successively increased and decreased, and feeding air pumped by the air pumping chamber to the engine working chamber.

2. The method of claim 1, wherein said feeding is effected by feeding air from the pumping chamber to an air accumulator zone, and wherein air is fed from the accumulator zone to the engine working chamber.

3. The method of claim 2, wherein air is vented from the accumulator zone to limit the pressure in the latter to a predetermined value.

4. The method of claim 3, wherein air vented from the accumulator zone is commingled with exhaust from the engine working chamber while the exhaust is still hot to promote further oxidation thereof.

5. The method of claim 1, wherein there is a total of four zones with each zone twice increasing and twice decreasing in volume during each orbit, and wherein two of said zones are operated as engine working chambers and the other two zones are operated as air pumping chambers.

6. The method of claim 5, wherein said feeding is effected by feeding air from the pumping chambers to an air accumulator zone, and wherein air is fed from the accumulator zone to the engine working chambers.

7. The method of claim 6, wherein air is vented from the accumulator zone to limit the pressure in the latter to a predetermined value.

8. The method of claim 7, wherein air vented from the accumulator zone is commingled with exhaust from the engine working chambers while the exhaust is still hot to promote further oxidation of the latter.

9. The method of claim 5, wherein said engine working chambers are circumferentially spaced from each other by the air pumping chambers.

10. The method of claim 9, wherein the engine working chambers are operated in time phase with each other, whereby they are spatially 180° out of phase with each other.

11. The method of claim 6, wherein air is fed to a working chamber during a continuous interval that commences while the volume of such working chamber is decreasing and terminates while the volume of such chamber is increasing.

12. In a rotary internal combustion engine of the type wherein a rotor is mounted for rotation within a housing having a spaced inner surface surrounding the rotor, with a plurality of sealing means circumferentially spaced about and rotatable with the rotor to contact sealingly the inner surface of the housing to separate space between the rotor and the inner surface into a plurality of zones inclusive of adjacent first and second zones that orbit the axis during rotation of the rotor, and wherein the inner surface is noncircular in an arrangement such that each zone alternately increases and decreases in volume as it orbits an axis within the housing, and wherein operating means is provided for cyclically operating the first zone as an internal combustion engine working chamber on a four-phase cycle involving successively an intake phase, a compression phase, a combustion phase and an exhaust phase, said cycle having a duration such that the volume of such first zone is successively increased, decreased, increased and decreased, and wherein the operating means is operatively connected to the rotor for synchronized operation thereof with rotation of the latter and includes means for introducing air to such working chamber, means for introducing fuel into such working chamber and means for exhausting combustion products from such working chamber; the improvement comprising in combination therewith the provision of air pumping means for cyclically operating the second zone as an air pumping chamber with the duration of a pumping cycle being such that the volume of said second zone is successively once increased and once decreased, said air pumping means being operatively connected to the rotor for synchronized operation thereof with rotation of the latter and includes normally closed valve means that opens between ambient atmosphere and the pumping chamber as the volume of the latter increases, and means for feeding air to the engine working chamber.

13. The combination of claim 12, wherein the air feeding means comprises an air accumulator operatively connected to the air pumping chamber for receiving and storing air at a superatmospheric pressure from the air pumping chamber, and means for operatively connecting the accumulator to the engine working chamber for delivering air to the latter at a superatmospheric pressure.

14. The combination of claim 13, including pressure relief means for venting excess air pressure from the accumulator.

15. The combination of claim 14, wherein means are provided for commingling air vented from the accumulator with hot exhaust from the engine working chamber, whereby further oxidation of the exhaust is promoted.

16. The combination of claim 13, wherein there are four zones with two of said zones being diametrically opposed and operated as engine working chambers, with the other two zones being diametrically opposed and operated as air pumping chambers.

17. The combination of claim 16, wherein said two engine working chambers are operated in phase with each other.

18. The combination of claim 13, wherein said last means is operative solely during a time interval that commences substantially prior to and terminates substantially after the beginning of one of its increases in volume.

19. In a rotary internal combustion engine of the type wherein a rotor is mounted for rotation in a housing having a generally oval inner wall surface with the rotor having four circumferentially spaced vane means rotatable therewith that slidingly and sealingly engage the wall surface to define and separate four chambers that are circumferentially spaced about the rotor that vary in volume during rotation of the rotor, the improvement comprising two of said chambers being diametrically opposed to each other and constituting engine working chambers, and the other two chambers being diametrically opposed to each other and constituting air pumping chambers, each of said engine working chambers being provided with intake means that are isolated from each other, with the intake means provided for one of the engine working chambers comprising said housing having first and second intake ports opening to a surface of rotation of the rotor, intake valve means for controlling the successive admission of air from the first and then the second intake ports during successive portions of the rotation of the rotor in one direction, said intake valve means including a passageway in the rotor that opens to said engine working chamber and the surface of revolution for successive registration with the first and second intake ports during predetermined portions of angular movement of the rotor, each of the engine working chambers being provided with exhaust means that are separated from each other, with the exhaust means for said one engine working chamber comprising the housing being provided with an exhaust port that opens to the surface of revolution and which is in registry with the said passageway during a predetermined portion of angular movement of the rotor, means for supplying air to the first intake port, and means inclusive of said air pumping chambers for compressing air and supplying the same to the second intake port.

20. The combination of claim 19, wherein the intake and exhaust means of said one engine working chamber are angularly related to the corresponding means of the other engine working chamber in an arrangement such that such engine working chambers are operated in phase with each other.

21. The combination of claim 19, wherein said means for supplying air to the second intake ports includes an air pressure accumulator.

22. The combination of claim 21, including pressure relief means for venting the accumulator.

23. The combination of claim 22, including means for mixing air vented from the accumulator with exhaust from the exhaust ports.

24. The combination of claim 19, wherein said means for compressing and supplying air to the second intake ports comprises said housing having a pair of inlet ports that open to a surface of revolution of the rotor at diametrically opposed positions and a pair of outlet ports that open to a surface of revolution of the rotor at diametrically opposed positions, said rotor having a pair of isolated passageways respectively opening to the air pumping chambers with each of such passageways being in registry alternately and sequentially with all the inlet and outlet ports during predetermined portions of angular movement of the rotor.

25. The combination of claim 24, wherein the outlet ports are connected by compressed air lines to a compressed air accumulator, said accumulator being connected by air supply lines to the intake ports.

26. The combination of claim 25, wherein said accumulator is adapted to contain a liquid lubricant whereby such lubricant is pressurized, and means for introducing a liquid lubricant from the accumulator into the inlet ports, whereby the engine is provided with lubrication for the oval surface with excess lubricant being returned to the accumulator with compressed air.

27. The combination of claim 26, including means for hydraulically applying the pressure of the liquid lubricant in the accumulator to urge the vane means radially outward against the oval surface.

28. The combination of claim 21, including means for hydraulically applying the pressure prevailing within the accumulator to urge radially outward movement of the vane means.

* * * * *